Figures 1, 2:
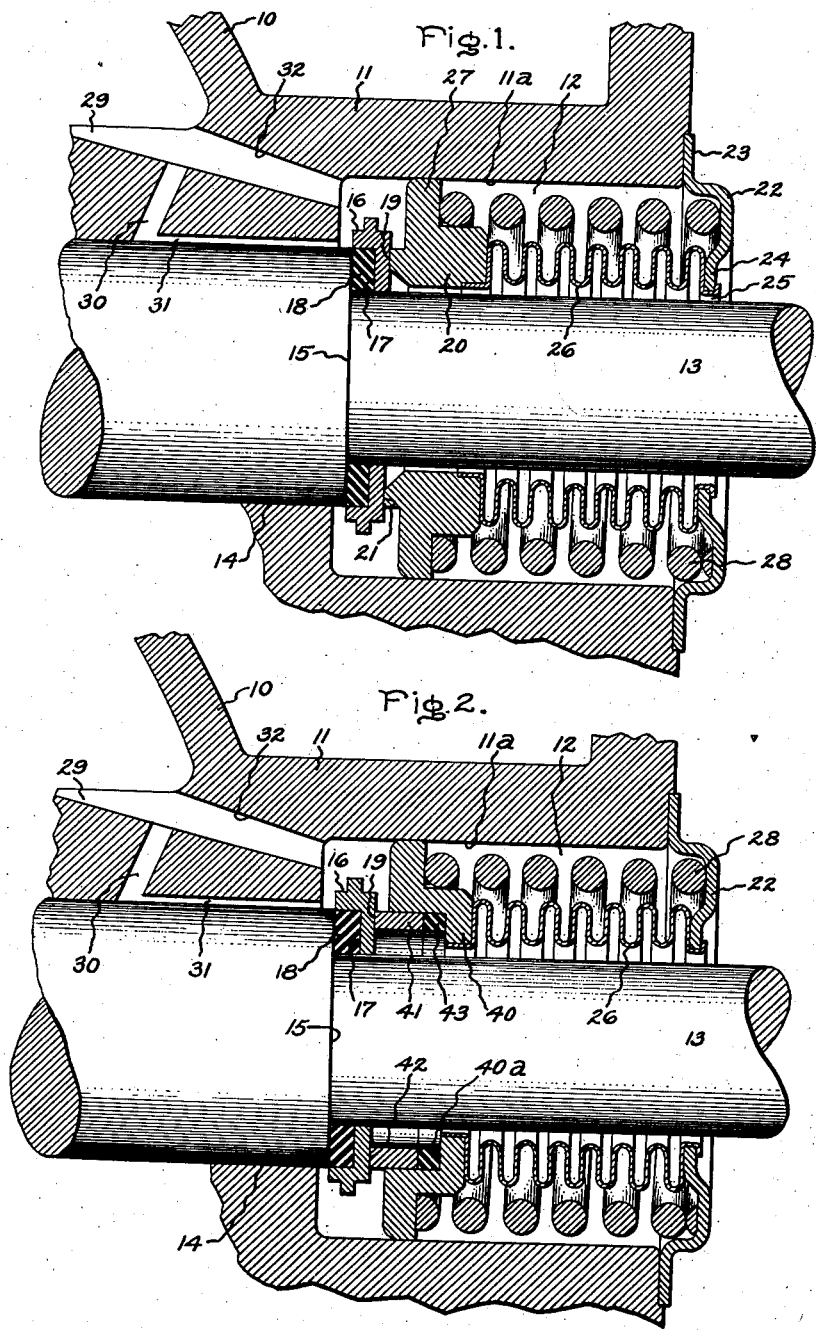

Jan. 24, 1939.      F. C. MASON      2,145,123
SHAFT SEAL
Filed Nov. 24, 1936

Inventor:
Frank C. Mason,
by Harry E. Dunham
His Attorney.

Patented Jan. 24, 1939

2,145,123

UNITED STATES PATENT OFFICE 2,145,123

SHAFT SEAL

Frank C. Mason, Fort Wayne, Ind., assignor to General Electric Company, a corporation of New York Application November 24, 1936, Serial No. 112,527

1 Claim. (Cl. 286—11)

My invention relates to shaft seals, such as used for refrigerant compressors or the like.

Compressors designed for use in refrigerating apparatus or the like are frequently driven by an electric motor connected to a suitable compressor drive shaft which extends through an aperture provided in the compressor casing. Since the compressor casing contains refrigerant vapor or other fluids, it is necessary to provide some sealing arrangement to prevent the escape of fluid from the casing through the drive shaft aperture therein. One common form of sealing arrangement for this purpose includes a resilient bellows which surrounds the shaft. The bellows is sealed to the compressor casing at one end and is secured to a metal sealing ring at its opposite end, the sealing ring being pressed in sealing engagement against a shoulder formed on the shaft. Oil contained in the interior of the compressor casing is conducted into contact with the shoulder formed on the drive shaft and the sealing ring pressed into sealing engagement therewith in order to lubricate these relatively rotating sealing surfaces. Difficulty has been encountered, however, in the operation of machines provided with shaft sealing arrangements of the type described due to wear and improper lubrication of the relatively rotating sealing surfaces, resulting in leakage of fluid between these surfaces.

It is an object of my invention to provide an improved shaft sealing arrangement in which leakage due to wear of the relatively rotating sealing surfaces is minimized.

It is another object of my invention to provide an improved shaft sealing arrangement in which the relatively rotating sealing surfaces are formed of materials which effectively seal the compressor casing and which require only slight lubrication during operation.

Further objects and advantages of my invention will become apparent as the following description proceeds, and the features of novelty which characterize my invention will be pointed out with particularity in the claim annexed to and forming a part of this specification.

For a better understanding of my invention reference may be had to the accompanying drawing in which Fig. 1 is a fragmentary sectional view of a portion of a refrigerant compressor provided with a shaft sealing arrangement embodying my invention; and Fig. 2 is a fragmentary sectional view, similar to Fig. 1, showing a modified form of the shaft sealing arrangement.

Referring to the drawing, I have shown in Fig. 1 a portion of a refrigerant compressor casing 10 provided with a boss 11 which is counterbored at 11a to define a chamber 12 therein. A drive shaft 13 is journaled in a bearing 14 in the compressor casing which communicates between the interior of the compressor casing and the chamber 12. The drive shaft 13 is of reduced diameter near its outer end, and is provided with a shoulder 15 slightly beyond the outer face of the bearing 14 and within the chamber 12. The outer end of the drive shaft 13 of reduced diameter extends through the chamber 12 to the outside of the compressor casing and is driven by a suitable source of power such, for example, as an electric motor. The larger inner end of the drive shaft 13 extends into the interior of the compressor casing and drives the compressor mechanism housed therein in any suitable manner.

During the operation of the compressor, gaseous refrigerant tends to leak from the interior of the compressor casing 10 along the drive shaft 13 into the chamber 12 and out of the compressor.

Accordingly, I have provided a sealing arrangement for preventing the escape of gaseous refrigerant and other fluids from the interior of the casing 10 including a removable collar 16 mounted on the drive shaft 13 in abutting relation with respect to the shoulder 15 provided thereon. The removable collar 16 is substantially L-shaped in cross section and is provided with an annular recess 17 extending about the inner side thereof and open to the drive shaft 13. An annular ring or member 18 of resilient material is positioned under compression in the recess 17, which forms a seal between the drive shaft 13 and the collar 16 and prevents relative rotation between them. The removable collar 16 has an outer transverse surface which is lapped concentrically and polished to provide a sealing surface 19. The resilient ring 18 preferably comprises polymerized chloro-2-butadiene-1, 3 with a filler material and is subject to expansion of about 8% and less than 10% by volume when saturated with lubricating oil. Polymerized chloro-2-butadiene-1, 3 is obtainable on the market under the trade name "Duprene" which ordinarily has various suitable fillers compounded therewith.

An annular sealing ring 20 surrounds the drive shaft 13 in spaced relation thereto. The sealing ring 20 has a relatively narrow transverse surface which is lapped concentrically and polished to provide a sealing surface 21. The sealing ring 20 is arranged in the chamber 12 in such a manner that its sealing surface 21 is in running engagement with the sealing surface 19 of the removable collar 16 to form a seal, thus preventing escape of fluids from the casing 10 to the atmosphere.

The collar 16 and the ring 20 are formed of steel alloy, and are provided with the transverse sealing surfaces 19 and 21, respectively, which have been hardened in their marginal layers by nitrogenization. In the sealing arrangement the collar 16 and the ring 20 comprise cooperating rotatable and stationary sealing elements, respectively, having nitrogenated sealing surfaces. I have found that these nitrogenated sealing surfaces form a very effective seal, run together for considerable periods without noticeable wear, and require only slight lubrication in operation. These nitrogenated sealing surfaces may be produced, for example, by the process described in Fry Patent No. 1,487,554, March 18, 1924. Preferably, the steel alloy from which these elements are formed is of the type described in Fry Patent No. 1,649,398, issued November 15, 1927, which contains:

| | Per cent |
|---|---|
| Chromium | 0.5 to 4 |
| Aluminum | 0.5 to 2 |
| Carbon | Up to 0.6 |

I have found that a chrome aluminum steel alloy having substantially the following chemical analysis is a very satisfactory material from which the elements 16 and 20 may be formed, as it lends itself particularly well to the formation of a sealing surface having hardened marginal or surface layers produced by nitrogenization:

| | Per cent |
|---|---|
| Carbon | 0.56 |
| Manganese | 0.54 |
| Molybdenum | 0.26 |
| Nickel | 0.57 |
| Aluminum | 1.34 |
| Chromium | 2.13 |
| Iron | Remainder |

Chrome aluminum alloys having substantially this chemical analysis are obtainable upon the market under the trade name "Nitralloy".

In the open end of the chamber 12 there is provided a disk 22 having an inwardly flared outer peripheral flange 23 removably secured in sealed relationship with the boss 11 in any suitable manner, as by screws. The disk 22 is also provided with an inwardly flared central portion 24 having a central opening 25 therein surrounding the drive shaft 13 in spaced relation thereto. An imperforate resilient metallic bellows 26 extends between the sealing ring 20 and the disk 22. The opposite ends of the bellows 26 are soldered or otherwise hermetically sealed to the adjacent portions of the sealing ring 20 and the disk 22, respectively. The bellows 26 thus forms a seal between the sealing ring 20 and the disk 22.

The sealing ring 20 is provided with an annular flange 27 about its circumference which engages the walls of the counterbore 11a and positions the sealing ring 20 within the chamber 12 so that its relatively narrow transverse sealing surface 21 is properly alined to squarely engage the sealing surface 19 of the collar 16. The helical compression spring 28 surrounds the bellows 26 and extends between the flange 27 of the sealing ring 20 and the intermediate portion of the disk 22 lying between the peripheral flange 23 and the central portion 24 thereof. This helical spring 28 firmly presses the sealing ring 20 and the removable collar 16 in sealing engagement with each other.

In the operation of the compressor, a portion of the lubricant contained in the compressor casing 10 is carried upwardly by the compressor mechanism housed therein and thrown into a recess 29 formed in the top of the bearing 14. This lubricant then passes through a passage 30 to the contacting surfaces of the drive shaft 13 and the bearing 14 to lubricate the same. A portion of the lubricant also flows along the drive shaft 13 through a longitudinal groove 31 formed in the bearing 14 and enters the interior of the chamber 12 formed by the counterbore 11a in the boss 11. The lubricant also flows from the recess 29 through a passage 32 into the chamber 12. It will be observed that a considerable amount of lubricant will be trapped and retained in the chamber 12 providing a seal of the flooded type. A small amount of the lubricant contained in the chamber 12 will find its way between the concentric lap marks provided in the sealing surfaces 19 and 21, thus affording the slight amount of lubrication required by these sealing surfaces in operation. The lubricant contained in the chamber 12 will come into contact with the resilient ring 18 positioned in the recess 17 formed in the removable collar 16. Ordinary rubber will increase in volume from 100% to 200% when saturated with lubricating oil. Consequently, I prefer that the resilient ring 18 comprises polymerized chloro-2-butadiene-1,3 since such material increases in volume less than 10% when saturated with lubricating oil, and is not appreciably deteriorated by contact therewith.

In Fig. 2 I have shown a modified form of my improved shaft sealing arrangement. In this construction an annular sealing ring 40, corresponding to the sealing ring 20 in Fig. 1, is provided with a recess 40a in the face thereof adjacent the removable collar 16. A relatively thin annulus 41 having a transverse sealing surface 42 is carried in the recess 40a adjacent a resilient annular ring or member 43 therein. Preferably the resilient ring 43 comprises polymerized chloro-2-butadiene-1, 3 as hereinbefore described. The resilient ring 43 is held in compression in the recess 40a between the annulus 41 and the ring 40, and tightly seals the annulus 41 to the ring 40 and prevents relative rotation therebetween. In this construction the helical compression spring 28 firmly presses the sealing surface 42 of the annulus 41 in sealing engagement with the sealing surface 19 of the removable collar 16. In this form of the shaft sealing arrangement, it is necessary to form only the thin annulus 41, in addition to the removable collar 16, of steel alloy of the character hereinbefore described, and provide only the relatively narrow transverse sealing surface 42 thereof, in addition to the sealing surface 19 of the removable collar 16, with hardened marginal layers produced by nitrogenization as previously explained. The construction of the sealing arrangement of Fig. 2 is otherwise similar to that described in connection with Fig. 1, and the same parts have been identified by the same reference characters.

It will thus be see that I have provided a simple and effective arrangement for sealing the shaft aperture of a compressor casing comprising relatively rotating sealing surfaces formed of materials which require only slight lubrication in operation.

While I have shown a particular embodiment of my invention in connection with a refrigerating machine, I do not desire my invention to be limited to the construction shown and described, and I intend in the appended claim to cover all modifications within the spirit and scope of my invention.

What I claim as new and desire to secure by Letters Patent of the United States is:

A shaft seal comprising a casing provided with a shaft aperture, a drive shaft extending through said aperture and provided with an annular shoulder, a removable collar mounted on said shaft adjacent said shoulder, said collar having a transverse nitrogenated steel alloy sealing surface, a ring provided with a recess therein, an annulus carried in said recess and having a nitrogenated steel alloy sealing surface engaging said transverse sealing surface of said collar, means including a resilient member positioned in said recess adjacent said annulus for sealing said annulus to said ring and for preventing relative rotation therebetween, means including a spring for pressing said annulus in sealing engagement with said collar, and means including an imperforate resilient bellows extending between said ring and said casing for sealing said ring to said casing.

FRANK C. MASON.